US009838241B2

(12) United States Patent
Hartley et al.

(10) Patent No.: US 9,838,241 B2
(45) Date of Patent: Dec. 5, 2017

(54) DISCOVERY OF SERVICES OVER INFRASTRUCTURE NETWORKS

(71) Applicant: BROADCOM CORPORATION, Irvine, CA (US)

(72) Inventors: Steven Hartley, Pointe-Claire (CA); Stephen Ray Palm, Irvine, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 63 days.

(21) Appl. No.: 14/615,392

(22) Filed: Feb. 5, 2015

(65) Prior Publication Data

US 2015/0222474 A1  Aug. 6, 2015

Related U.S. Application Data

(60) Provisional application No. 61/936,830, filed on Feb. 6, 2014.

(51) Int. Cl.
| | | |
|---|---|---|
| *H04W 4/00* | (2009.01) | |
| *H04L 29/08* | (2006.01) | |
| *H04W 76/02* | (2009.01) | |

(52) U.S. Cl.
CPC ..... *H04L 29/08648* (2013.01); *H04W 76/023* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 2005/0021786 A1* | 1/2005 | Kikkawa | ........... | H04L 29/12009 709/229 |
| 2006/0291412 A1* | 12/2006 | Naqvi | ................... | H04M 7/123 370/328 |

(Continued)

OTHER PUBLICATIONS

Camps-Mur, et al., "Device-to-device commuinications with Wi-Fi Direct: overview and experimentation," IEEE Xplore Digital Library, Jun. 2013, vol. 20, Issue 3, abstract.

(Continued)

*Primary Examiner* — Otis L Thompson, Jr.
(74) *Attorney, Agent, or Firm* — McDermott Will & Emery LLP (57) ABSTRACT

The subject system allows electronic devices in an infrastructure network to discover direct peer-to-peer services, such as screencasting, access to peripheral devices, etc., that can be provided over the infrastructure network. Since the electronic devices already have a layer two (link layer) connection with each other over the infrastructure network, pre-association device and/or service discovery protocols, such as those provided by Wi-Fi Direct and the like, are not available to the electronic devices. Thus, the subject system provides a post-association mechanism that allows the electronic devices to query, advertise, discover, and access direct peer-to-peer services over the infrastructure network. Furthermore, the subject system extends access of the direct peer-to-peer services to wired networks, such as Ethernet networks, Multimedia over Coax Alliance (MoCA) networks, powerline networks, and the like.

20 Claims, 7 Drawing Sheets

(56) References Cited

U.S. PATENT DOCUMENTS

| | | | | |
|---|---|---|---|---|
| 2009/0265443 | A1* | 10/2009 | Moribe | G06F 15/16 709/217 |
| 2011/0222465 | A1* | 9/2011 | Arashin | H04W 76/023 370/315 |
| 2011/0295962 | A1* | 12/2011 | Yasuma | G06F 9/5055 709/206 |
| 2012/0042275 | A1* | 2/2012 | Neerudu | G06F 3/1454 715/781 |
| 2013/0100486 | A1* | 4/2013 | Mccoog | G06F 3/1204 358/1.15 |
| 2013/0148642 | A1* | 6/2013 | Abraham | H04W 8/005 370/338 |
| 2014/0006474 | A1* | 1/2014 | White | H04N 5/44543 709/201 |
| 2014/0232618 | A1 | 8/2014 | Perrin et al. | |
| 2014/0351445 | A1 | 11/2014 | Davidson et al. | |
| 2015/0049673 | A1* | 2/2015 | Higashiyama | H04W 4/02 370/328 |
| 2015/0058491 | A1* | 2/2015 | Miyama | H04L 67/16 709/227 |

OTHER PUBLICATIONS

Camps-Mur, et al., "Device-to-device commuinications with Wi-Fi Direct: overview and experimentation," retrieved from http://www.campsmur.cat/files/camps_ssavedra_serrano_WCM_11_00112_final_version.pdf, 2013, 8 pages.

Wikipedia, "Miracast," retrieved from http://en.wikipedia.org/index.php?title=Miracast&oldid=593624626, Feb. 2014, 5 pages.

\* cited by examiner

Example XML Template 510

```
<?xml version="1.0" encoding="UTF-8"?>
<mi:WFDisplayInfo xsi:schemaLocation="http://www.company.com/schemas/mi-WFDisplayInfo.xsd mi-WFDisplay-130409.xsd"
xmlns:mi="http://www.company.com/schemas/mi-WFDisplayInfo.xsd" xmlns:xsi="http://www.w3.org/2001/XMLSchema-instance">
  <mi:WFDisplayInfo>
    <mi:NumberWFDisplaySessionInstances>instances</mi:NumberWFDisplaySessionInstances>
    <mi:WFDisplaySession>
      <mi:WFDisplaySessionType>role </mi:WFDisplaySessionType>
      <mi:WFDisplayControlPort>port</mi:WFDisplayControlPort>
      <mi:ContentprotectionSupportedVersions>ver</ ContentprotectionSupportedVersions>
      <mi:WFDisplaySessionAvailability>availability </WFDisplaySessionAvailability>
    </mi:WFDisplaySession>
</mi:WFDisplayInfo>
```

Example XML Tag Description 520

| Name | Description | Values | Required/Optional |
|---|---|---|---|
| NumberWFDisplay SessionInstances | A device might be capable of supporting multiple sink and/or source sessions simultaneously. This field will list the number of possible sessions. | 0-255 | R |
| WFDisplaySession | Each session will contain this tag to open and close unique session information. | NA | R |
| WFDisplaySessionType | What the session will be (sink or source) | Source PrimarySink SecondarySink | R |
| WFDisplayControlPort | The RTSP port number for the session | 32 bit integer | R |
| Contentprotection SupportedVersions | Coma separated list of supported content protection technology | none HDCP2.0 HDCP2.1 | R |
| WFDisplaySession Availability | Is the session available or in use (not available) | Available NotAvailable | R |

FIG. 5

Example DNS-TXT record format

| SD Item | Key | Value | Size |
|---|---|---|---|
| Device Type | type | primary_sink | 0x11 |
| | | secondary_sink | 0x13 |
| | | source | 0x0B |
| Session Availability | session_avil | 1 | 0x0E |
| | | 0 | 0x0E |
| Content Protection | content_protection | Type and Version number (ex. HDCP1.0, HDCP2.1) Value of 0 for device not supporting content protection | 0x15 |

610

DNS-TXT Record Example:

| 0x0b | type=source | 0x0e | session_avil=1 | 0x15 | content_protected=HDCP2.1 |

DISCOVERY OF SERVICES OVER INFRASTRUCTURE NETWORKS

CROSS-REFERENCE TO RELATED APPLICATIONS

The present application claims the benefit of U.S. Provisional Patent Application Ser. No. 61/936,830, entitled "Service Discovery System," filed on Feb. 6, 2014, which is hereby incorporated by reference in its entirety for all purposes.

TECHNICAL FIELD

The present description relates generally to service discovery over a network, including discovery of services over infrastructure networks.

BACKGROUND

Wi-Fi Direct, WiDi, and other wireless standards enable wireless devices to communicate directly with one another without requiring a wireless access point. The wide adoption of Wi-Fi across multiple different types of user devices, e.g. computers, mobile phones, tablets, etc., makes Wi-Fi well-suited for direct communications with peripheral devices, such as external displays, printers, user input devices, and the like. Furthermore, some of these wireless standards, such as Wi-Fi Direct, provide service discovery at the link layer, such that devices can exchange messages to identify available services before associating (e.g. connecting) with one another.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject system allows electronic devices in an infrastructure network to discover services, such as direct peer-to-peer services including screencasting, access to peripheral devices, etc., that can be provided over the infrastructure network. Since the electronic devices already have a layer two (link layer) connection with each other over the infrastructure network, pre-association device and/or service discovery protocols, such as those provided by Wi-Fi Direct and the like, are not available to the electronic devices. Thus, the subject system provides a post-association mechanism that allows the electronic devices to query, advertise, discover, and access services, such as direct peer-to-peer services, over the infrastructure network. Furthermore, for electronic devices that only include a wireless network interface, such as Wi-Fi Direct, WiDi, etc., the subject system extends access of services, such as direct peer-to-peer services, to wired networks, such as Ethernet networks, Multimedia over Coax Alliance (MoCA) networks, powerline networks, and the like. In this manner, the subject system allows a user to connect to their home network and access the direct peer-to-peer services provided by devices on their home network.

Figure 1:
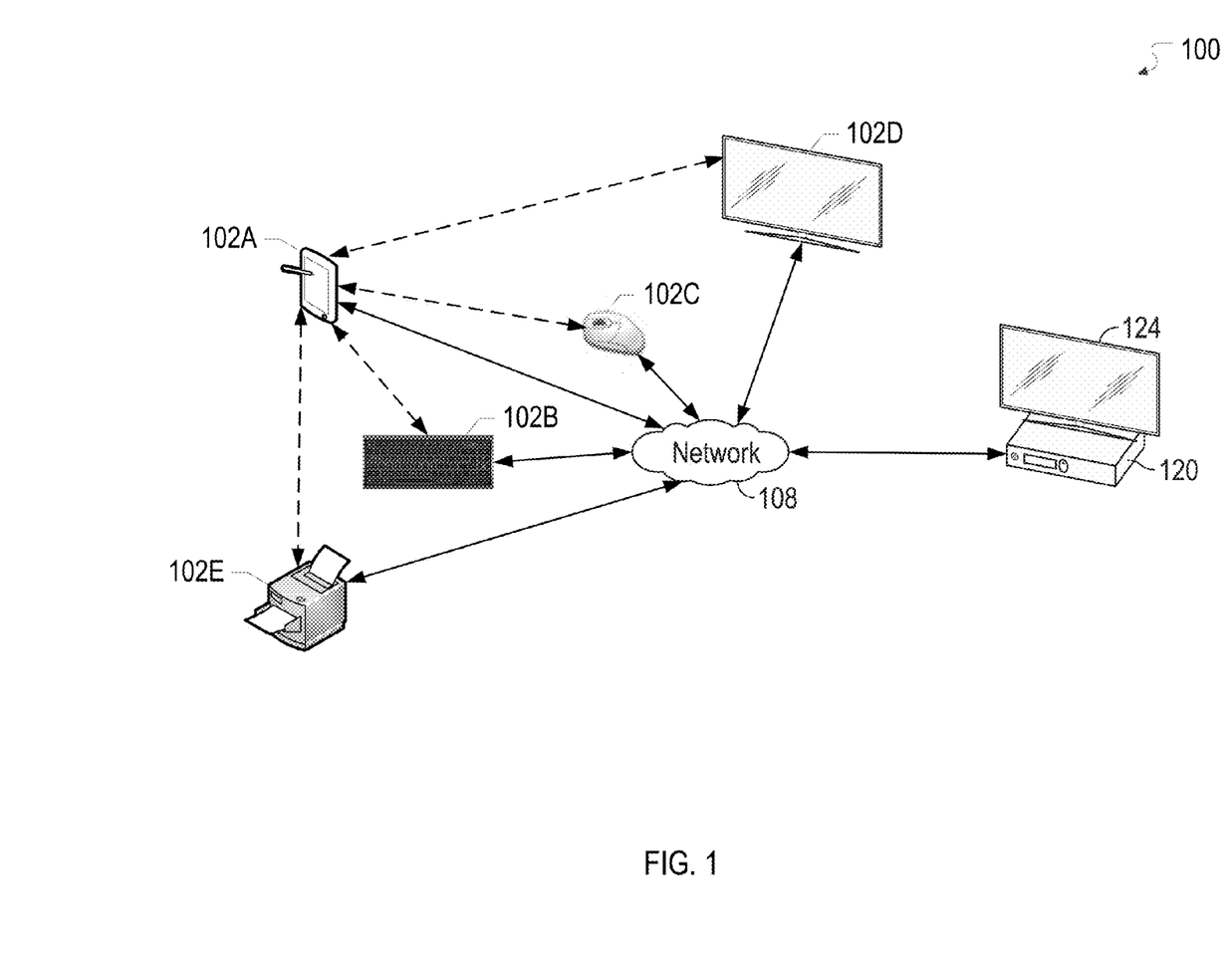
FIG. 1 illustrates an example network environment in which a system for discovery of services over an infrastructure network may be implemented in accordance with one or more implementations.

FIG. 1 illustrates an example network environment 100 in which a system for discovery of services over an infrastructure network may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes one or more electronic devices 102A-E and a set-top box device 120 that are communicably coupled to an infrastructure network 108. The infrastructure network 108 may include one or more wired and/or wireless network devices, such as wireless access devices, routers, switches, etc. In one or more implementations, the infrastructure network includes wired Ethernet devices, MoCA devices, power line devices, and the like.

The set-top box device 120 may be coupled to, and capable of presenting video content on, an output device 124, such as a television, a monitor, speakers, or any device capable of presenting video content. In one or more implementations, the set-top box device 120 is integrated into the output device 124. In one or more implementations, the set-top box device 120 communicatively couples the electronic devices 102A-E to an external network, such as the Internet. The set-top box device 120 may also include and/or be communicatively coupled to a wireless access point which allows the electronic devices 102A-E to connect to the infrastructure network 108. In this instance, the set-top box device 120, or the communicatively coupled wireless access point, assigns internet protocol (IP) addresses to the electronic devices 102A-E for communicating over the infrastructure network 108. In one or more implementations, the set-top box device 120 may communicatively couple an additional device (not shown) to the infrastructure network 108 via a wired connection, such as an Ethernet connection, a MoCA connection, and/or a power line connection.

The electronic devices 102A-E can be computing devices such as laptop or desktop computers, smartphones, set-top boxes, peripheral devices, user input devices, tablets, televisions or other displays with one or more processors coupled thereto and/or embedded therein, or other appropriate devices that include wireless network interfaces, such as wireless local area network (WLAN) radios. In the example of FIG. 1, the electronic device 102A is depicted as a tablet device, the electronic device 102B is depicted as a keyboard device, the electronic device 102C is depicted as a mouse device, the electronic device 102D is depicted as a television, and the electronic device 102E is depicted as a printer device. One or more of the electronic devices 102A-E, the set-top box device 120 and/or the output device 124 may be and/or may include all or part of the electronic system discussed below with respect to FIG. 7.

The electronic devices 102A-E and/or the set-top box device 120 may include appropriate wireless network interfaces for connecting to the infrastructure network 108 and also for establishing direct, e.g. peer-to-peer, network connections, such as Wi-Fi Direct connections, Bluetooth connections, or generally any direct wireless network connections. In FIG. 1, the electronic devices 102A is illustrated as capable of forming peer-to-peer connections with each of the electronic devices 102B-E. However, the electronic devices 102B-E and/or the set-top box device 120 may also be capable of forming peer-to-peer connections with one another, e.g. independent of the electronic device 102A.

The peer-to-peer connections may be utilized by the electronic device 102A to access services provided by the electronic devices 102B-E, such as user input services provided by the electronic devices 102B-C, display services provided by the electronic device 102D, and/or printing services provided by the electronic device 102E. For example, the electronic device 102A may deliver audio and/or video streams over the direct connection to the electronic device 102D, and/or to a device coupled to the electronic device 102D, such as an adapter, a dongle, etc. In one or more implementations, the electronic device 102A may transcode the audio and/or video streams prior to delivering the audio and/or video streams to the electronic device 102D. The electronic device 102D outputs and/or presents the audio and/or video streams, e.g. to a user. In one or more implementations, the electronic devices 102A,D also communicate control information over the direct connection, e.g. the electronic device 102D may communicate user input received via an infra-red remote control to the electronic device 102A.

The electronic devices 102A-E may rely on a pre-association wireless discovery protocol, such as the pre-association discovery protocol of Wi-Fi Direct, to discover, pair, and form the direct peer-to-peer network connections. Thus, when the electronic devices 102A-E are associated with one another, such as over the infrastructure network 108, the pre-association discovery protocol will be unavailable. Furthermore, if the set-top box device 120 communicatively couples an additional device (not shown) to the infrastructure network 108 via a wired connection, such as an Ethernet network interface, a MoCA network interface, a power line network interface (e.g. HomePlug), the additional device may be unable to partake in the pre-association wireless discovery protocol due to its lack of a wireless network interface.

The subject system provides a discovery protocol that allows the electronic devices 102A-E, and/or the set-top box device 120, when connected to the infrastructure network 108, to advertise, discover and access services over the infrastructure network 108. The services may include, for example, direct peer-to-peer services, services typically provided over the infrastructure network 108, or generally any service that may be provided over a network connection. In one or more implementations, the electronic devices 102A-E may utilize an architecture and/or technology, such as a universal plug and play (UPnP) device architecture, a domain name system (DNS) architecture, and/or a RUI-H architecture, to advertise and/or discover capable devices, such as DLNA HTML5 RUI capable devices, RVU RUI capable devices, Miracast capable devices, etc., that are on infrastructure connections, e.g. connected to the infrastructure network 108. In this manner, the subject system allows services, such as direct peer-to-peer services, to be accessed over an infrastructure network 108 and also allows access to the services, such as direct peer-to-peer services, by electronic devices without wireless network interfaces, such as wired Ethernet devices, MoCA devices, power line devices, etc.

For example, after connecting to the infrastructure network 108, the electronic devices 102A-E may transmit messages over the infrastructure network 108 that advertise, and/or request information regarding, services, such as direct peer-to-peer services, that are available. The advertising messages, and/or messages responding to search requests, may include resource identifiers, such as uniform resource locators (URLs), for accessing service descriptions corresponding to the available services. The electronic devices 102A-E and/or the set-top box device 120, may retrieve the service descriptions over the infrastructure network 108 via the resource identifiers. The service descriptions may include attributes related to accessing the available services over the infrastructure network 108. Example service description messages are discussed further below with respect to FIGS. 5 and 6. The electronic devices 102A-E and/or the set-top box device 120 may then access and/or provide access to, the services over the infrastructure network 108 based at least in part on the attributes of the service descriptions. An example process for discovering and accessing a service, such as a direct peer-to-peer service, over an infrastructure network 108 is discussed further below with respect to FIG. 3, and an example process for providing a service, such as a direct peer-to-peer service, over an infrastructure network 108 is discussed further below with respect to FIG. 4.

Figure 2:
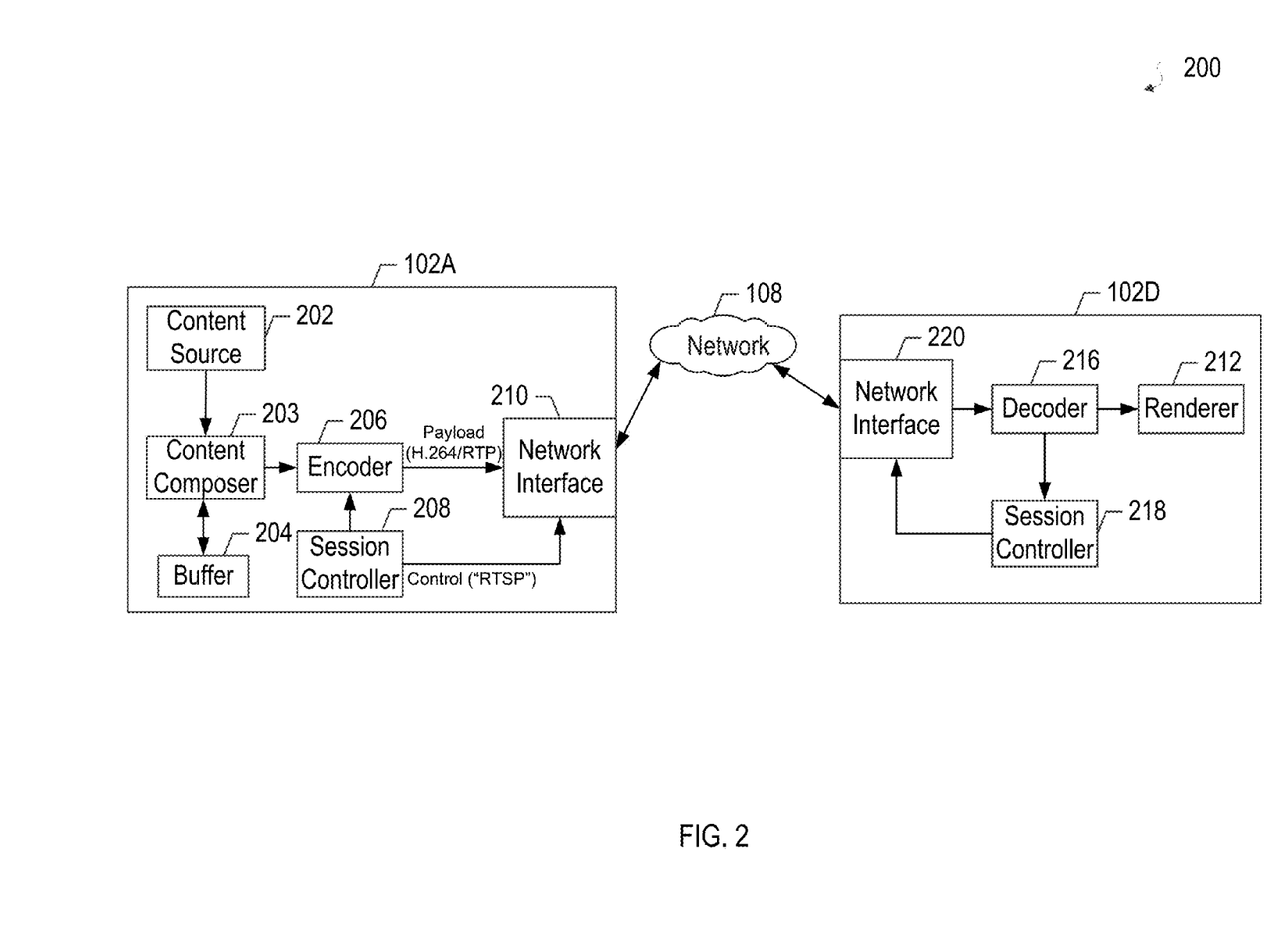
FIG. 2 illustrates an example network environment in which a system for discovery of services over an infrastructure network may be implemented in accordance with one or more implementations.

FIG. 2 illustrates an example network environment 200 in which a system for discovery of services over infrastructure networks may be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 200 includes the electronic devices 102A,D and the infrastructure network 108. For explanatory purposes, the network environment 200 is illustrated as including the electronic devices 102A,D which are implementing a direct peer-to-peer screencasting, or audio-video streaming, service, such as Miracast. However, the principles discussed with respect to the network environment 200 can be applied to any other service, such as access to a printing service provided by the electronic device 102E and/or access to a user input service provided by the electronic devices 102B,C.

The electronic device 102A includes a content source 202, such as stored, downloaded, or generated content, a content composer 203, a buffer 204, such as a dynamic random access memory (DRAM) screen buffer, an encoder 206, such as an H.264 encoder, a session controller 208, and a network interface 210. The electronic device 102D includes a renderer 212, a decoder 216, such as a H.264 decoder, a session controller 218, and a network interface 220.

In one or more implementations, the electronic devices 102A,D may utilize the network interfaces 210, 220 to associate directly with one another via a peer-to-peer connection. For example, the electronic devices 102A,D may perform a pre-association discovery protocol to discover one another and the services that each provides, and may then associate, e.g. connect, with one another. However, in the network environment 200, the electronic devices 102A,D are associated with one another via the infrastructure network 108. Furthermore, the electronic device 102D may be coupled to the infrastructure network 108 via a wired network connection. Accordingly, pre-association discovery protocols are not available to the electronic devices 102A,D since they are already associated with one another via the infrastructure network 108. Thus, the electronic devices 102A,D may perform one or more of the example processes discussed below with respect to FIGS. 3 and 4 in order to discover one another and access services, such as direct peer-to-peer services, over the infrastructure network 108.

The session controllers 208, 218 of the respective electronic devices 102A,D transmit control information over the infrastructure network 108 to configure the service, such as using the real-time streaming transport protocol (RTSP) over the transmission control protocol (TCP). The control information may include device capability negotiation and session maintenance information. Once the electronic devices 102A,D have completed device/service discovery and configuration, the electronic device 102A begins providing encoded content to the electronic device 102D over the infrastructure network 108.

For example, the content composer 203 retrieves content from the content source 202 and provides the content to the encoder 206. The encoder 206 encodes the content in a format suitable for the electronic device 102D and provides the encoded content to the network interface 210 for transmission to the electronic device 102D over the infrastructure network 108, such as using the real-time transport protocol (RTP) over user datagram protocol (UDP). The electronic device 102D receives the content via the network interface 220, decodes the content with the decoder 216, renders the decoded content using the renderer 212, and outputs the rendered content. The electronic device 102A that provides the encoded content may be referred to as a source device, and the electronic device 102D that outputs the decoded content may be referred to as a sink device.

In one or more implementations, the electronic device 102A may generate a user interface, encode the user interface into a video stream, and provide the user interface to the electronic device 102A. When a user interacts with the user interface output by the electronic device 102D, the electronic device 102D provides an indication of the user interaction to the electronic device 102A, for example via the control information exchanged by the session controllers 208, 218. The electronic device 102A may update the user interface in view of the user interaction, to provide for remote user interface functionality, and may provide the updated user interface to the electronic device 102D. In one or more implementations, remote user interface functionality may be provided via Digital Living Network Alliance (DLNA) hypertext markup language 5 (HTML5) remote user interface (RUI), RVU remote user interface (RUI), and/or Miracast technologies. In one or more implementations, Miracast and similar technologies allow the display of an electronic device 102A, such as a tablet or smart phone, to be mirrored onto a display device, such as the electronic device 102D and/or a set-top box device 120, and vice-versa.

In one or more implementations, one or more of the content source 202, the content composer 203, the buffer 204, the encoder 206, the session controllers 208,218, the network interfaces 210,220, the decoder 216, and/or the renderer 212 may be implemented in software (e.g., subroutines and code) and/or in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
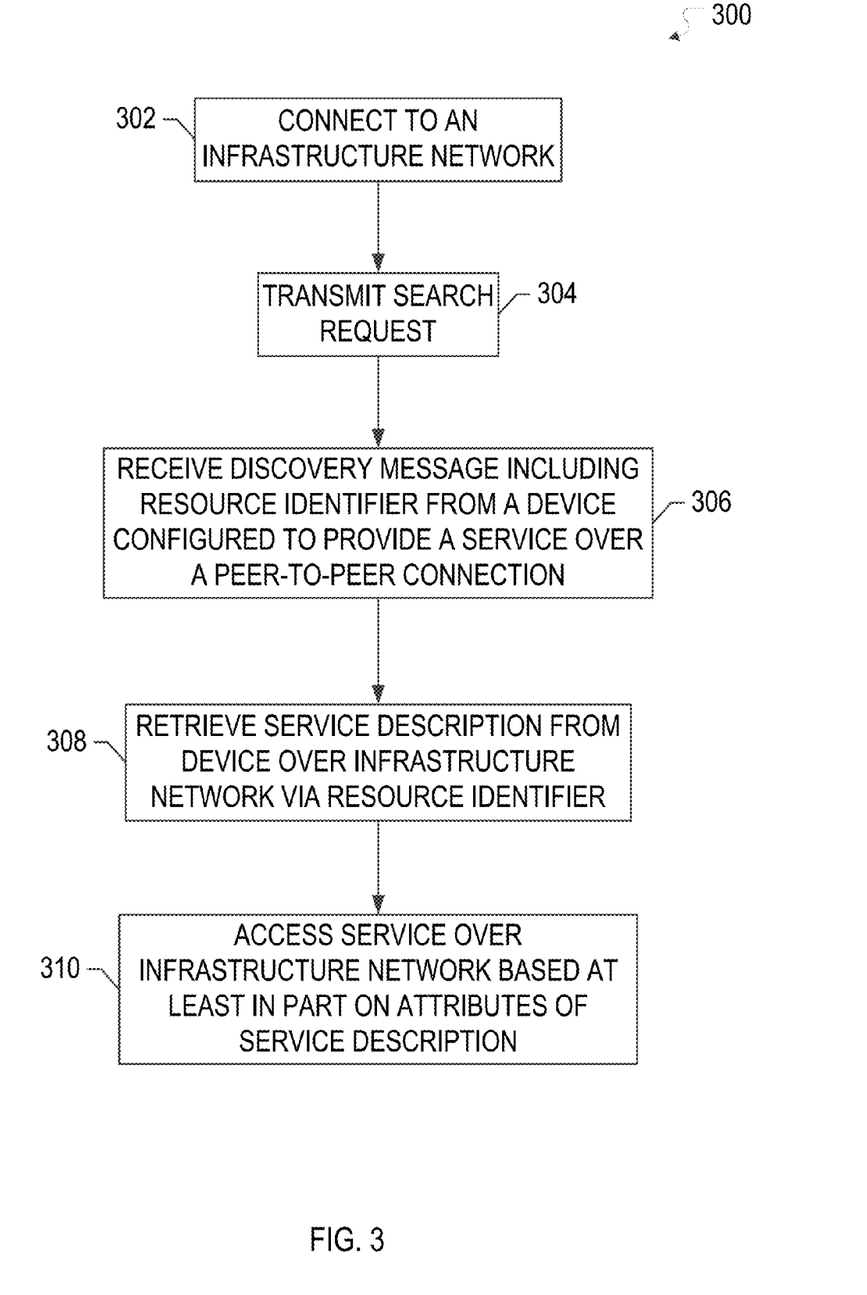
FIG. 3 illustrates a flow diagram of an example process of an electronic device in accordance with one or more implementations.

FIG. 3 illustrates a flow diagram of an example process 300 of an electronic device 102A in accordance with one or more implementations. For explanatory purposes, the example process 300 is primarily described herein with reference to the electronic device 102A of FIGS. 1-2; however, the example process 300 is not limited to the electronic device 102A of FIGS. 1-2, e.g. the example process 300 may be performed by one or more of the electronic devices 102B-E and/or the set-top box device 120, and/or the example process 300 may be performed by one or more components of the electronic device 102A. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The electronic device 102A connects to the infrastructure network 108 (302). For example, the electronic device 102A may be assigned an IP address by a router associated with the infrastructure network 108, such as the set-top box device 120. After connecting to the infrastructure network 108 (302), the electronic device 102A transmits a search request message (304), such as an M-SEARCH request message for simple service discovery protocol (SSDP) implementations and/or a multicast domain name system (mDNS) message with a DNS pointer record (DNS-PTR) format for a Browse( ) request of zero configuration networking (Zeroconf) implementations. The mDNS message includes an identifier of the service type being searched for, such as "_miracast._tcp" for a Miracast service, and returns any available service instances. The mDNS message is addressed to a multicast address, such as 224.0.0.251 for IPv4 and ff02:fb for IPv6 link-local addressing The M-SEARCH messaging may be bi-directional in that the electronic device 102A may also receive, and respond to, M-SEARCH messages from the other electronic devices 102B-E on the infrastructure network 108. In one or more implementations, the electronic device 102A transmits an M-SEARCH request message over UDP to the IP version 4 (IPv4) multicast address 239.255.255.250 and UDP port 1900. The M-SEARCH request message may include the following information:
M-SEARCH*HTTP/1.1
HOST: 239.255.255.250:1900
MAN: "ssdp:discover"
MX: 10
ST:urn:schemas-upnp-org:service-1-0

The electronic device 102A then receives a discovery message, such as an M-SEARCH response message or one or more DNS-PTR records, that includes a resource identifier of a device that is configured to provide a service over a peer-to-peer connection (306), such as the electronic device 102D. In one or more implementations that support Zeroconf, the received DNS-PTR records may include service instance information for each available service instance. The services instances may utilize a naming convention such as "_sessionNN._servicetype._tcp.DNSdomain". The NN represents each session (or service instance) that the device can support, the servicetype identifies the type of service (such as "_miracast" for Miracast services), and the DNSdomain is the hostname or IP address of the device. The session value may be used to distinguish between different sessions in a multi-session environment to allow support for devices that simultaneously implement sink and multi-session source support.

The M-SEARCH response includes a LOCATION header containing an absolute HTTP URL for accessing the service description, e.g. a UPnP description, associated with the electronic device 102D. In one or more implementations, the host portion of the URL resolves to an IPv4 address, or is an IPv4 address. The M-SEARCH response may include the following information:
HTTP/1.1 200 OK
LOCATION: http://192.168.1.155:1900/WFDisplayInfo.xml
CACHE-CONTROL: max-age=1800
EXT:
BOOTID.UPNP.ORG: 1
SERVER: OS/version UPnP/1.0 product/version
ST: urn:schemas-upnp-org:service-1-0
USN: uuid:550e8400-e29b-41d4-a716-446655440000
urn:schemas-upnp-org:service-1-0

In one or more implementations, the electronic device 102A receives an advertisement message that includes a resource identifier, or an unsolicited discovery message that includes a resource identifier, over the infrastructure network 108 without transmitting a search request. For example, the electronic device 102A may receive an unsolicited mDNS message (for Zeroconf implementations) and/or an unsolicited multicast HTTP message (for SSDP implementations) from one or more of the electronic devices 102A-E, such as the electronic device 102D.

The electronic device 102A then retrieves service description information from the electronic device 102D utilizing the resource identifier included in the discovery message, such as the location header of the M-SEARCH response, or a service instance (including DNSdomain) identified in a DNS-PTR record (308). In one or more implementations that utilize Zeroconf, the electronic device 102A utilizes the Query( ) request to transmit a DNS service (DNS-SVR) record request for the service instance to the electronic device 102D and then retrieves the DNS-SVR and DNS text (DNS-TXT) records for the service instance from the electronic device 102D In one or more implementations that utilize SSDP, the electronic device 102A issues an HTTP GET request to the URL received in the LOCATION header of the M-SEARCH response. An example HTTP GET request may be:
GET/WFDisplayInfo.xml HTTP/1.1
Host: 192.168.1.155:1900
Accept: */*

The retrieved service description includes attributes for accessing the service, such as a direct peer-to-peer service, of the electronic device 102D over the infrastructure network 108. In one or more implementations supporting Zeroconf, the service description is retrieved in the form of a DNS-SVR record and/or a DNS-TXT record. The DNS-SVR record may include attributes that indicate a port number, such as an RTSP port number, and IP address (or hostname) for accessing the service, such as a direct peer-to-peer service, over the infrastructure network 108. The DNS-TXT record may include service specific attributes, such as session availability information (is the service/session available for connection), device type information (e.g. primary sink, secondary sink, source), and content protection information, e.g. for a Miracast service. An example DNS-TXT record is discussed further below with respect to FIG. 6.

In one or more implementations, the DNS-SVR and/or DNS-TXT records published by the electronic device 102D, e.g. without being requested by the electronic device 102A. Publishing is the act of registering (advertising) a service to an embedded DNS server running on the device. The DNS server then broadcasts the DNS-SVR and/or DNS-TXT records over the infrastructure network 108 using mDNS messages and then waits for incoming DNS-PTR or DNS-SVR requests to respond to with the local services instances information.

In one or more implementations supporting SSDP, the service description is retrieved in the form of an extensible markup language (XML) file. The service description XML file may include attributes for accessing the service, such as a direct peer-to-peer service, over the infrastructure network 108, such as a port number and/or IP address. The service description XML file may also include service specific attributes, such as the number of sessions that are supported, device type information (e.g. primary sink, secondary sink, source) for each session, port numbers for accessing each session, and content protection information (whether content protection is supported) for each session, e.g. for a Miracast service. An example service description XML file is discussed further below with respect to FIG. 5.

The electronic device 102A then accesses the service, such as a direct peer-to-peer service, provided by the electronic device 102D over the infrastructure network 108 based at least in part on the attributes of the service description (310). For example, the electronic device 102A may determine that the electronic device 102D is has an available session as a sink device, and the electronic device 102A may transmit an audio and/or video stream over the infrastructure network 108 for presentation on the electronic device 102D.

Figure 4:
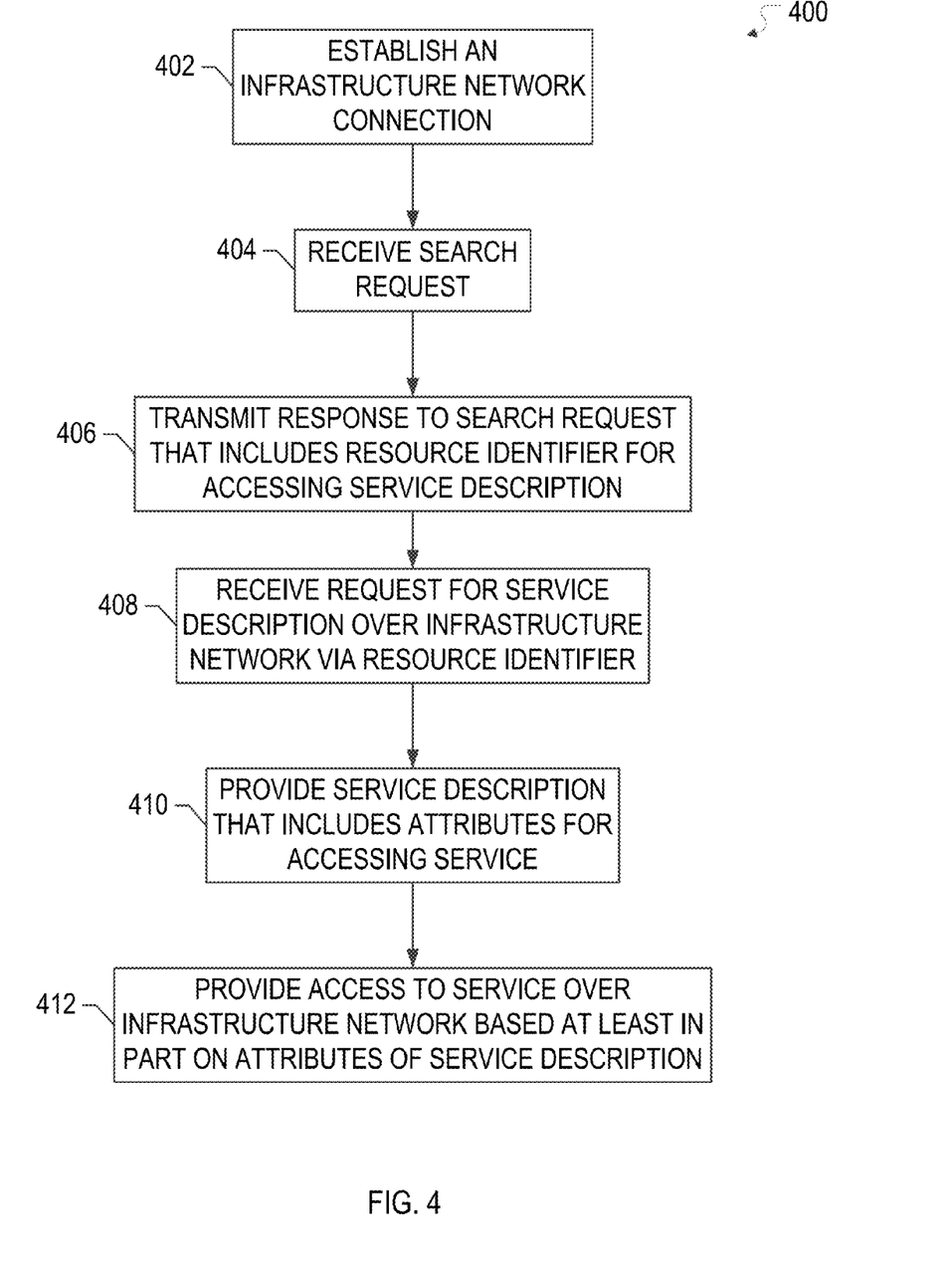
FIG. 4 illustrates a flow diagram of an example process of an electronic device in accordance with one or more implementations.

FIG. 4 illustrates a flow diagram of an example process 400 of an electronic device 102D in accordance with one or more implementations. For explanatory purposes, the example process 400 is primarily described herein with reference to the electronic device 102D of FIGS. 1-2; however, the example process 400 is not limited to the electronic device 102D of FIGS. 1-2, e.g. the example process 400 may be performed by one or more of the electronic devices 102B-E and/or the set-top box device 120, and/or the example process 400 may be performed by one or more components of the electronic device 102D.

Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The electronic device 102D connects to the infrastructure network 108 (402). For example, the electronic device 102D may be assigned an IP address by a router associated with the infrastructure network 108, such as the set-top box device 120. The electronic device 102D receives a search request from the electronic device 102A, such as an M-SEARCH request message, or an mDNS message of a Browse( ) request (404). The electronic device 102D transmits a response to the search request that includes a resource identifier for accessing a service description, such as an M-SEARCH response message or one or more DNS-PTR records (406).

The electronic device 102D receives a request from the electronic device 102A to retrieve the service description via the resource identifier, such as in the form of an HTTP GET request or a Query( ) request (408). The electronic device 102D provides the service description to the electronic device 102A, such as in the form of a service description XML file and/or DNS-SVR and DNS-TXT records (410). The service description includes one or more attributes for accessing a service, such as a direct peer-to-peer service, provided by the electronic device 102D, such as an IP address, port number, and availability of the service.

The electronic device 102D then receives, from the electronic device 102A, a request to access the service, such as a direct peer-to-peer service, over the infrastructure network 108 based at least in part on the attributes of the service description. The electronic device 102D provides the electronic device 102A with access to the service over the infrastructure network 108 (412).

Figure 5:
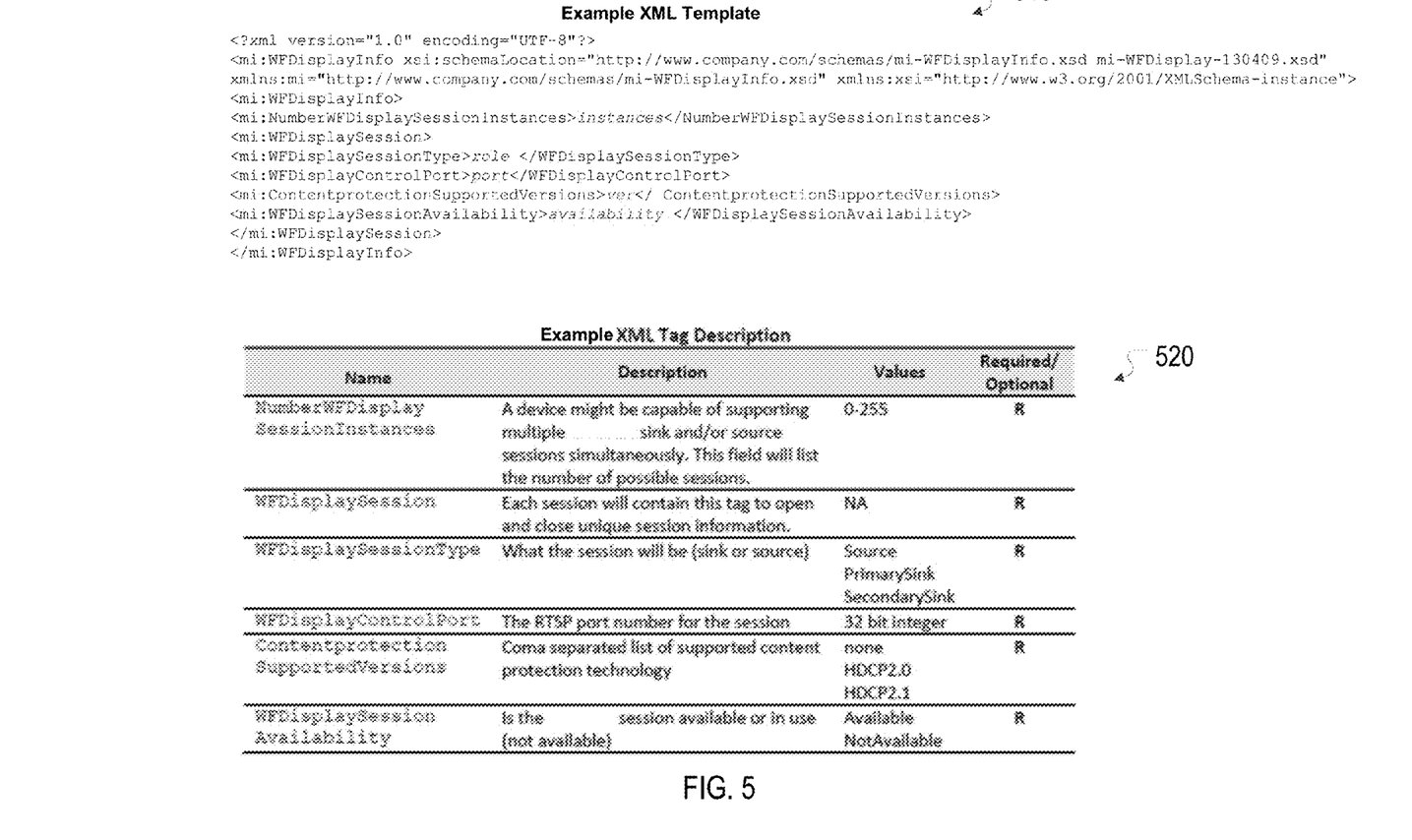
FIG. 5 illustrates an example extensible markup language (XML) file template for an example service in accordance with one or more implementations.

FIG. 5 illustrates an example XML file template 510 for an example service in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

For explanatory purposes, the example XML file template 510 pertains to a screencasting service, such as a Miracast service. However, the example XML file template 510 can be modified to accommodate any other service, such as any other direct peer-to-peer service. As described in the example XML tag description 520, the XML file template 510 includes a NumberWFDisplaySessionInstances tag that indicates a number of possible sessions supported by the device. The XML file template 510 further includes a WFDisplaySession tag that is used to open and close unique session information. The XML file template 510 further includes a WFDisplaySessionType tag that indicates whether the role of the device in the session corresponds to a source, a primary sink, or a secondary sink. The XML file template 510 further includes a WFDisplayControlPort tag that indicates the RTSP port number for the session. The XML file template 510 further includes a ContentProtectionSupportedVersions tag that lists the supported content protection technology(ies), such as none, HDCP2.0, and/or HDCP2.1. The WFDisplaySessionAvailability tag indicates whether the session is available or not available (e.g. in use).

Figure 6:
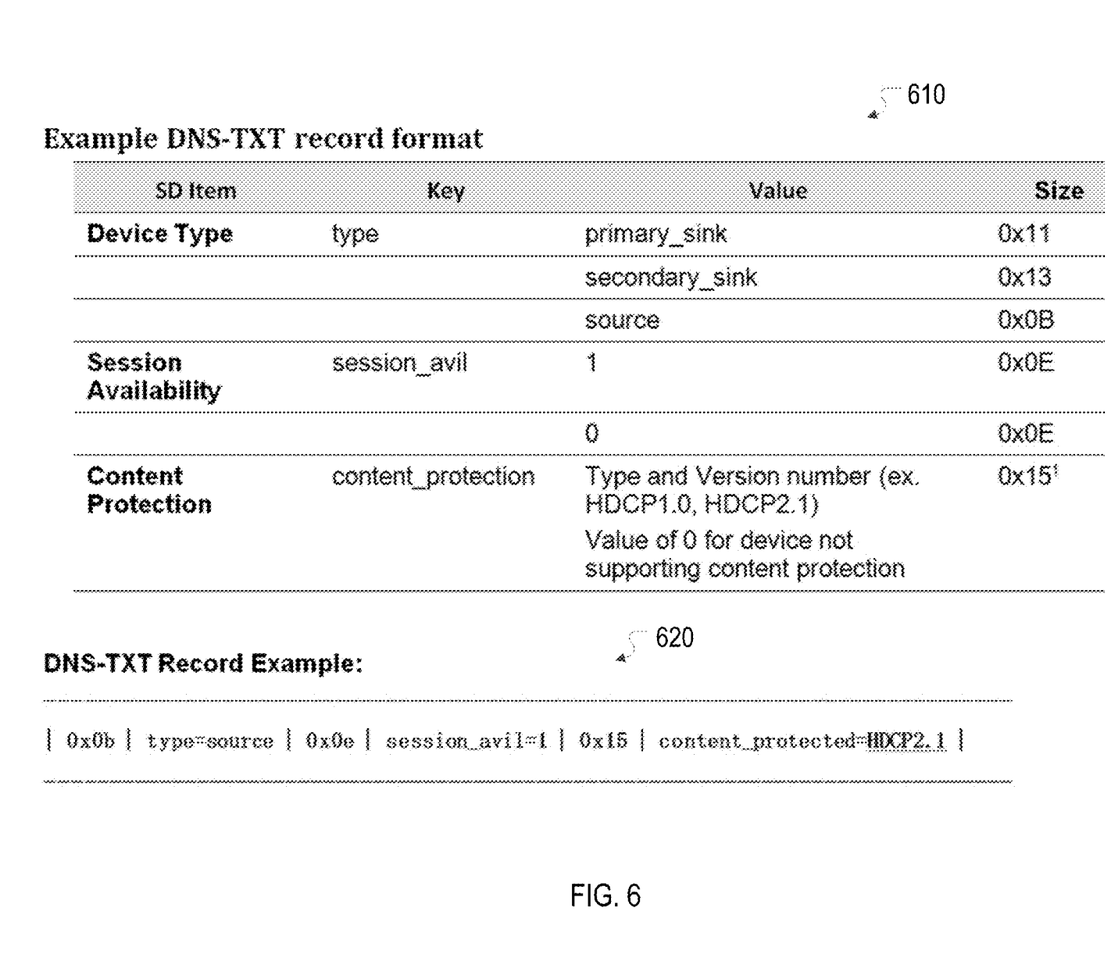
FIG. 6 illustrates an example domain name system text (DNS-TXT) record format for an example service in accordance with one or more implementations.

FIG. 6 illustrates an example DNS-TXT record format 610 for an example service in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

For explanatory purposes, the example DNS-TXT record format 610 pertains to a screencasting service, such as a Miracast service. However, the example DNS-TXT record format 610 can be modified to accommodate any other service, such as any other direct peer-to-peer service. The DNS-TXT record format 610 includes a device type item which indicates whether the role of the device is a source, primary sink or secondary sink, a session availability item which indicates whether the session is available, and a content protection item which indicates which content protection technologies is supported for the service. The content protection value size may vary depending on the supported version and should match the total number of characters in the string "content_protection=<version>". The DNS-TXT record example 620 illustrates an example DNS-TXT record for a device that is a source device, has an available session, and supports HDCP2.1 for the session.

Figure 7:
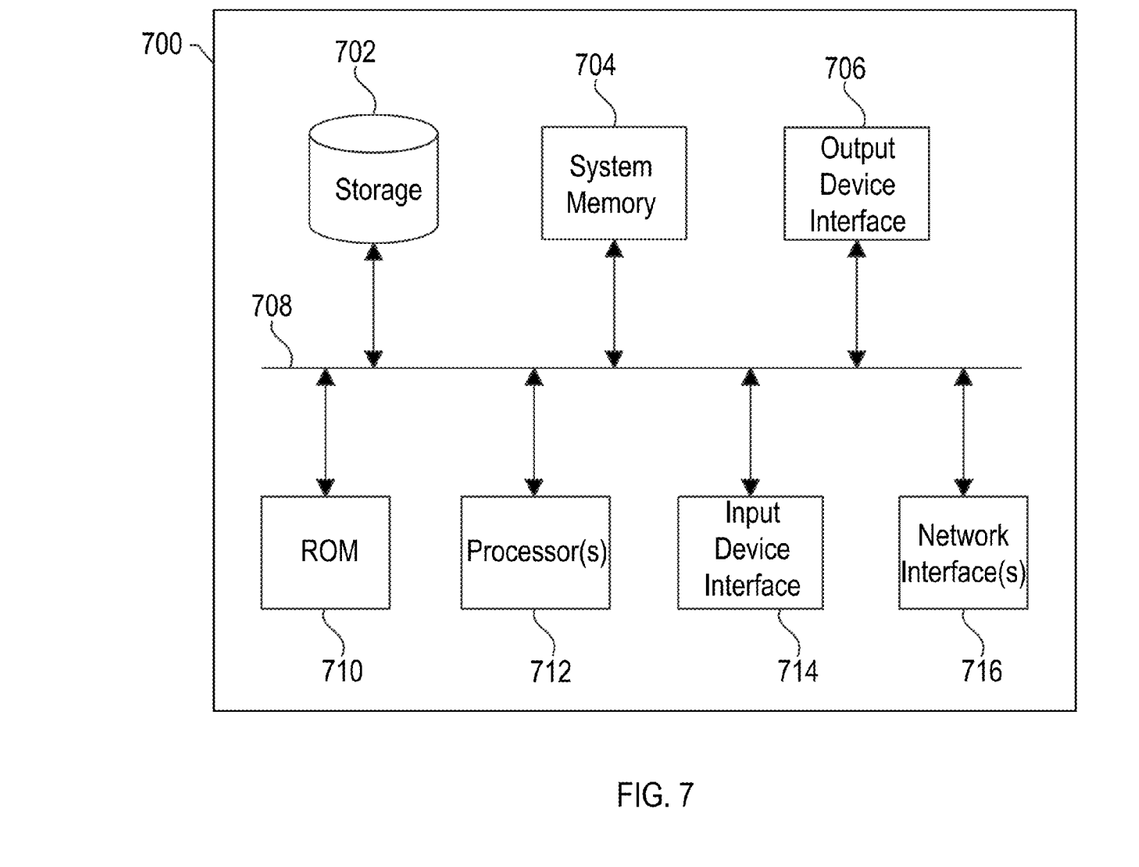
FIG. 7 conceptually illustrates an example electronic system with which one or more implementations of the subject technology can be implemented.

FIG. 7 conceptually illustrates an example electronic system 700 with which one or more implementations of the subject technology can be implemented. The electronic system 700, for example, may be, or may include, one or more of the electronic devices 102A-E, and/or the set-top box device 120, one or more wearable devices, a desktop computer, a laptop computer, a tablet device, a phone, and/or generally any electronic device. Such an electronic system 700 includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, one or more network interface(s) 716, and/or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are utilized by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory (RAM). The system memory 704 may store one or more of the instructions and/or data that the one or more processing unit(s) 712 may utilize at runtime. In one or more implementations, the processes of the subject disclosure are stored in the system memory 704, the permanent storage device 702, and/or the ROM 710. From these various memory units, the one or more processing unit(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, bus 708 also couples electronic system 700 to one or more networks (not shown) through one or more network interface(s) 716. The one or more network interface(s) may include Bluetooth interface, a Bluetooth low energy (BLE) interface, a Zigbee interface, an Ethernet interface, a Wi-Fi interface, a MoCA interface, a reduced gigabit media independent interface (RGMII), or generally any interface for connecting to a network. In this manner, electronic system 700 can be a part of one or more networks of computers (such as a local area network (LAN), a personal area network (PAN), a peer-to-peer network (P2P), a wide area network (WAN), or an Intranet, or a network of networks, such as the Internet. Any or all components of electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, SSD, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "access point", "receiver", "computer", "server", "processor", and "memory" all refer to electronic or other technological devices. These terms exclude people or groups of people. For the purposes of the specification, the terms "display" or "displaying" means displaying on or by an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
    connecting to an infrastructure network;
    receiving, over the infrastructure network, a discovery message from a device configured to provide a direct peer-to-peer service over a peer-to-peer network connection, wherein the discovery message comprises a resource identifier for retrieving a description of the direct peer-to-peer service from the device and the peer-to-peer network connection is establishable with the device without connecting to the infrastructure network;
    retrieving, over the infrastructure network and from the device via the resource identifier, the description of the direct peer-to-peer service; and
    accessing, over the infrastructure network, the direct peer-to-peer service based at least in part on the description of the direct peer-to-peer service.

2. The method of claim 1, further comprising:
    transmitting a search request over the infrastructure network, wherein the discovery message is received in response to the search request.

3. The method of claim 2, wherein the search request comprises a multicast search request.

4. The method of claim 1, wherein the discovery message comprises an unsolicited advertisement message transmitted by the device.

5. The method of claim 1, wherein the description comprises a plurality of attributes of the direct peer-to-peer service, the plurality of attributes comprising a port number for accessing the direct peer-to-peer service and an availability of the direct peer-to-peer service.

6. The method of claim 5, wherein the description comprises an extensible markup language (XML) file, the plurality of attributes available for the direct peer-to-peer service, and the plurality of attributes describe an operating mode for the device.

7. The method of claim 6, wherein accessing, over the infrastructure network, the direct peer-to-peer service further comprises:
    providing, over the infrastructure network, at least one of an audio stream or a video stream to be presented at the device.

8. The method of claim 1, further comprising:
    disconnecting from the infrastructure network;
    establishing the peer-to-peer network connection with the device; and
    accessing, over the peer-to-peer network connection, the direct peer-to-peer service based at least in part on the description of the direct peer-to-peer service.

9. The method of claim 1, wherein the device comprises a user input device and accessing, over the infrastructure network, the direct peer-to-peer service further comprises:
receiving, over the infrastructure network, user input from the user input device.

10. A device comprising:
at least one processor circuit configured to:
establish a peer-to-peer network connection without establishing an infrastructure network connection and provide a direct peer-to-peer service over the peer-to-peer network connection;
establish the infrastructure network connection and transmit, over the infrastructure network connection, a description of the direct peer-to-peer service;
receive, in response to the transmitting the description, a request to access the direct peer-to-peer service over the infrastructure network connection; and
provide access to the direct peer-to-peer service over the infrastructure network connection.

11. The device of claim 10, wherein at the at least one processor circuit is further configured to:
transmit, over the infrastructure network connection, one or more discovery messages that comprise a resource identifier for retrieving a description of the direct peer-to-peer service; and
receive, over the infrastructure network connection and in response to the one or more discovery messages, a request for the description of the direct peer-to-peer service, wherein the description of the direct peer-to-peer service is transmitted in response to the request for the description.

12. The device of claim 11, wherein the at least one processor circuit is further configured to:
receive, over the infrastructure network connection, a search request, wherein the one or more discovery messages are transmitted in response to the search request.

13. The device of claim 10, wherein the description comprises a plurality of attributes of the direct peer-to-peer service, the plurality of attributes comprising a port number for accessing the direct peer-to-peer service and an availability of the direct peer-to-peer service.

14. The device of claim 13, wherein the description comprises an extensible markup language (XML) file, and the plurality of attributes available for the direct peer-to-peer service.

15. The device of claim 14, wherein the at least one processor circuit is configured to:
receive, over the infrastructure network connection, at least one of an audio stream or a video stream; and
output the at least one of the audio stream or the video stream.

16. The device of claim 10, wherein the device comprises a user input device and the at least one processor circuit is configured to:
receive user input; and
transmit the user input over the infrastructure network connection.

17. A computer program product comprising instructions stored in a non-transitory computer-readable storage medium, the instructions comprising:
instructions to establish a peer-to-peer network connection with a device without connecting to an infrastructure network;
instructions to access a direct peer-to-peer service provided by the device over the peer-to-peer network connection with the device and subsequently disconnect the peer-to-peer network connection;
instructions to connect to the infrastructure network;
instructions to receive from the device, over the infrastructure network, information for accessing the direct peer-to-peer service over the infrastructure network, the direct peer-to-peer service having previously been accessed over the peer-to-peer network connection with the device; and
instructions to access the direct peer-to-peer service over the infrastructure network based at least in part on the received information.

18. The computer program product of claim 17, the instructions further comprising:
instructions to transmit a search request over the infrastructure network;
instructions to receive, over the infrastructure network and in response to the search request, a response message from the device, wherein the response message comprises a resource identifier for retrieving the information for accessing the direct peer-to-peer service; and
instructions to transmit, over the infrastructure network, a request for the information via the resource identifier, wherein the information is received in response to the request.

19. The computer program product of claim 18, wherein the search request comprises a multicast search request.

20. The computer program product of claim 17, wherein the information comprises a plurality of attributes for accessing the direct peer-to-peer service, the plurality of attributes comprising a port number for accessing the direct peer-to-peer service and an availability of the direct peer-to-peer service.

* * * * *